(12) United States Patent
Cavaliere et al.

(10) Patent No.: US 10,576,692 B2
(45) Date of Patent: Mar. 3, 2020

(54) PRE-POLYMERIZED THERMOSETTING COMPOSITE PART AND METHODS FOR MAKING SUCH A PART

(71) Applicant: AIRBUS GROUP SAS, Blagnac (FR)

(72) Inventors: Frédérick Cavaliere, Montigny le Bretonneux (FR); Christophe Paris, Paris (FR); Daniel Aliaga, Aubervilliers (FR)

(73) Assignee: AIRBUS, Blagnac (FR)

( * ) Notice: Subject to any disclaimer, the term of this patent is extended or adjusted under 35 U.S.C. 154(b) by 298 days.

(21) Appl. No.: 15/508,446

(22) PCT Filed: Sep. 1, 2015

(86) PCT No.: PCT/FR2015/052313
§ 371 (c)(1),
(2) Date: Mar. 2, 2017

(87) PCT Pub. No.: WO2016/034809
PCT Pub. Date: Mar. 10, 2016

(65) Prior Publication Data
US 2017/0282446 A1 Oct. 5, 2017

(30) Foreign Application Priority Data

Sep. 3, 2014 (FR) ...................... 14 58237

(51) Int. Cl.
*B29C 65/00* (2006.01)
*B29C 65/50* (2006.01)
(Continued)

(52) U.S. Cl.
CPC .... *B29C 66/73754* (2013.01); *B29C 35/0266* (2013.01); *B29C 65/48* (2013.01); *B29C 65/4835* (2013.01); *B29C 65/5028* (2013.01); *B29C 65/5057* (2013.01); *B29C 66/02* (2013.01); *B29C 66/1122* (2013.01); *B29C 66/341* (2013.01); *B29C 66/45* (2013.01); *B29C 66/721* (2013.01); *B29C 66/73751* (2013.01);
(Continued)

(58) Field of Classification Search
CPC ....... B29C 66/73751–73755; B29C 66/73941; B32B 2305/74; C08J 5/24
See application file for complete search history.

(56) References Cited

U.S. PATENT DOCUMENTS

2010/0124659 A1 5/2010 Nelson et al.
2014/0144568 A1* 5/2014 MacAdams ................ C09J 5/02
156/62.8
(Continued)

FOREIGN PATENT DOCUMENTS

EP 2 732 957 A2 5/2014
FR 2 909 919 A1 6/2008
FR 3 001 408 A1 8/2014

*Primary Examiner* — Carson Gross
(74) *Attorney, Agent, or Firm* — Im IP Law; Chai Im; C. Andrew Im

(57) ABSTRACT

A part made of a fiber-reinforced composite material includes a structure made from a set of fibers supported in a thermosetting resin and a peel ply across all or part of the outer surface of the structure. The part has a gradient of polymerization at the interface between the structure and the peel ply. Also, methods for making such a part and methods for bonding such parts.

5 Claims, 2 Drawing Sheets

(51) Int. Cl.
  *B29C 70/44* (2006.01)
  *B29C 35/02* (2006.01)
  *B29C 70/54* (2006.01)
  *B29C 65/48* (2006.01)
  *C08J 5/24* (2006.01)
  *B29K 101/10* (2006.01)
  *B29K 105/08* (2006.01)

(52) U.S. Cl.
  CPC .. *B29C 66/73753* (2013.01); *B29C 66/73755* (2013.01); *B29C 66/73941* (2013.01); *B29C 70/443* (2013.01); *B29C 70/54* (2013.01); *B29C 66/71* (2013.01); *B29K 2101/10* (2013.01); *B29K 2105/089* (2013.01); *B32B 2305/74* (2013.01); *C08J 5/24* (2013.01)

(56) References Cited

U.S. PATENT DOCUMENTS

2014/0174632 A1* 6/2014 Roman ............... C08J 5/24
  156/87
2015/0056433 A1* 2/2015 MacAdams ........... C09J 163/04
  428/221

* cited by examiner

PRE-POLYMERIZED THERMOSETTING COMPOSITE PART AND METHODS FOR MAKING SUCH A PART

RELATED APPLICATIONS

This application is a § 371 application from PCT/FR2015/052313 filed Sep. 1, 2015, which claims priority from French Patent Application No. 14 58237 filed Sep. 3, 2014, each of which is incorporated herein by reference in its entirety.

FIELD OF THE INVENTION

The present invention belongs to the field of parts made from thermosetting resin composite material. It relates in particular to a pre-polymerized fiber-reinforced composite material part. It also relates to methods for manufacturing such a part.

The invention is in particular suitable for the production of structural parts in the aeronautical field, such as stiffened monolithic parts or any other aircraft or helicopter structural parts made of composite material that have to be assembled (fuselage panels, wing panels, stiffeners, frames, ribs, longerons, blades, etc.).

BACKGROUND OF THE INVENTION

Composite materials are today widely used for the manufacture of parts in many industrial fields, such as the aeronautical field, including for structural parts, that is to say parts that have to withstand significant stresses during their use.

A composite material generally consists of a fibrous reinforcement and a resin, the combination of which makes it possible to obtain a complex whose properties surpass those of the starting materials. Thus, composite material parts have many advantages linked in particular to their properties of strength, lightness and ease of forming.

The most commonly used method for producing a thermosetting composite material part consists in producing a structure by stacking reinforcing layers or plies of fibers preimpregnated with a thermosetting resin, referred to as a preimpregnated fibrous preform, with features and according to a shape adapted to that of the final composite material part to be produced, then in curing the resin, by polymerization, under a vacuum cover, in an autoclave or an oven. The part obtained has, throughout its thickness, the same degree of polymerization.

Another method also widely used for producing such a part essentially consists in diffusing thermosetting resin uniformly, by injection or infusion, into the fibrous preform, this time that is initially dry, having the shape of the part to be produced. After evacuation of the gases and distribution of the resin, the latter is cured, by polymerization, in a mold or a vacuum cover to give the desired composite material part. This method is RTM (Resin Transfer Molding) or LRI (Liquid Resin Infusion). In the same way as for the previous method, the part obtained has, throughout its thickness, the same degree of polymerization.

Certain aircraft structural parts are produced from individual parts, produced by one of the methods mentioned above, and joined to one another by bonding. For example, the fuselage or wing panels consist of an assembly of a skin and stiffeners.

Three bonding assembly methods are used in aeronautics:
the co-curing bonding method: it consists of the assembling by polymerization of two unpolymerized parts, the joint between the two parts being made with or without adhesive film;
the co-bonding method: it consists of the assembling by polymerization of one polymerized part and of one unpolymerized part, the joint between the two parts being made by an adhesive film;
the secondary-bonding method: it consists of the assembling by bonding of two polymerized parts, the joint between the two parts being made by an adhesive film.

The co-curing bonding method has the advantage of not requiring sanding and cleaning surface preparation of the parts before assembly. It furthermore gives the final assembly a good mechanical strength.

The co-bonding and secondary-bonding methods have the advantage, unlike the co-curing bonding method, of simplifying the manufacturing, storing, handling and nondestructive testing operations of the individual parts polymerized before bonding. They also have a good mechanical strength of the final assembly.

Although satisfactory, these existing methods each have numerous drawbacks, among other things:
for the co-bonding and secondary-bonding methods:
lack of a reliability of the bonded joint, i.e. a possible appearance of bonding having a low, or even very low mechanical strength in the joint, also referred to as a kissing bond;
inability to detect these kissing bonds by nondestructive testing and therefore an inability to detect the parts having a low mechanical strength in the bonded joint;
need for surface preparation of the parts;
recourse to fastenings to eliminate the risk of delamination at the bonding interface;
for the co-curing bonding method:
complex use of the equipment and in the handling of the unpolymerized parts and consequently a high cost for assembling two parts;
storage of the unpolymerized parts under specific conditions (generally at −18° C.) before bonding;
carrying out nondestructive testing operations after assembly and polymerization, and consequently a high complexity and a high cost for testing the assembly.

Consequently, there is a need to provide a solution that makes it possible to produce bonding between two parts having a good mechanical strength, and a reliability of the bonded joint similar to that obtained with the co-curing bonding method, while having a greater ease of use in order to reduce costs.

SUMMARY OF THE INVENTION

The present invention proposes to produce a pre-polymerized fiber-reinforced composite material part.

The present invention relates to a fiber-reinforced composite material part comprising a structure formed of an assembly of fibers held in a thermosetting resin and a peel ply over all or some of an outer surface of the structure. The part is characterized by a polymerization gradient at an interface between the structure and the peel ply.

The peel ply is a fabric for protecting the outer surface of the part until the bonding operation. It is positioned on the surface of the part before polymerization, at the location where this part must be subsequently assembled, by bonding, with another part. It is easily removed after polymerization, by simple peeling, just before the bonding operation.

A polymerization gradient is understood to mean that the degree of polymerization of the part varies as a function of the location in the thickness of said part.

The part according to the invention is such that the polymerization gradient is solely at the interface between the structure and the peel ply. The polymerization gradient is decreasing from the outer surface of the structure toward the peel ply.

In the gradient zone, the resin has a low degree of polymerization over, at most, several tens of μm of thickness at the interface. A low degree of polymerization is understood to mean a degree of polymerization of less than 40%.

Unlike the current parts, obtained by existing methods, where the polymerization is uniform throughout the thickness of the part, i.e. where the degree of polymerization is the same irrespective of the location in the thickness of the part, even at the structure-peel ply interface, the part according to the invention is polymerized uniformly, except on the surface, at the structure-peel ply interface.

The presence of such a polymerization gradient is particularly advantageous in the sense that such a part, although already having undergone a polymerization, can be subsequently bonded by co-curing, which can in no way be carried out with existing polymerized parts.

In one embodiment of the invention, the part is a part polymerized, in the structure, to at least 75%.

The invention also relates to a method for producing a fiber-reinforced composite material part as described above in at least one of its embodiments, comprising the steps of:
producing a fibrous preform preimpregnated with an unpolymerized resin, obtained essentially by a ply or a stack of plies,
depositing a fibrous fabric preimpregnated with an unpolymerized resin and free of curing agent or lightly laden with curing agent, over all or some of a surface of an outer ply,
polymerizing the fibrous preform and fibrous fabric assembly, and therefore the resin contained in the fibrous preform.

At the end of the polymerization step, the preform is held in the resin and forms the structure of the polymerized final part and the fibrous fabric is connected to the structure and forms the peel ply. A polymerization gradient is obtained at the interface between the structure and the peel ply.

The resin with which the preform is impregnated comprises a curing agent intended to enable the polymerization of said resin during the polymerization step.

The thermosetting resin is for example of epoxy type.

Since the impregnated resin of the fibrous fabric is free of curing agent or lightly laden with curing agent, it does not therefore polymerize very much during the polymerization step, at the polymerization temperature of the thermosetting resin of the preform.

The expression "lightly laden with curing agent" is understood to mean from 1% to 30% by weight of the nominal amount of curing agent recommended by the suppliers.

This nominal amount of curing agent to be mixed with the resin, recommended by the suppliers, varies according to the products. It may for example range from 10% by weight of curing agent to be added to the resin, therefore a weight ratio of 100:10, up to 100% by weight of curing agent to be added to the resin. In this case, a weight ratio of 1:1 is obtained, there is as much curing agent, by weight, as resin.

In other words, the amount of curing agent in the composition of the resin of the fibrous fabric is defined such that, once the part is polymerized, the interface between the structure and the peel ply is polymerized very little, but is polymerized sufficiently so that the peel ply adheres lightly to the outer surface of the structure and does not peel off of its own free will without outside help. Optionally, the peel ply has a dry appearance on the outer surface.

In one exemplary embodiment of the method, the resin contained in the preform and the resin contained in the fibrous fabric are identical. They only differ from one another by the presence or absence of curing agent.

Such a method for producing parts is particularly advantageous in that it modifies the existing associated conventional method very little. Only the fibrous fabric is modified here. The dry fibrous fabric generally used is replaced by a fibrous fabric impregnated with a resin that is free of curing agent or lightly laden with curing agent.

In one mode of implementation of the method, the thermosetting resin contained in the fibrous preform is polymerized to a degree greater than or equal to 75%.

The invention also relates to a method for producing a fiber-reinforced composite material part as described above in at least one of its embodiments. The invention comprises the steps of:
producing a fibrous preform preimpregnated with an unpolymerized thermosetting resin, said preform being obtained essentially by a ply or a stack of plies,
depositing an intermediate resin layer, said resin being unpolymerized and free of curing agent or lightly laden with curing agent, over all or some of a surface of an outer ply of the preform,
depositing a dry fibrous fabric on the intermediate resin layer, which fabric therefore becomes impregnated with the resin of the intermediate layer,
polymerizing the fibrous preform, intermediate resin layer and fibrous fabric assembly, and therefore the thermosetting resin contained in the fibrous preform.

A dry fibrous fabric is understood to mean a ply or a stack of plies that is not preimpregnated with thermosetting resin.

It is, for example, formed of nylon fibers, polyester fibers or glass fibers.

At the end of the polymerization step, the preform is held in the resin and forms the structure of the polymerized final part and the fibrous fabric is connected to the structure and forms the peel ply. A polymerization gradient is obtained at the interface between the structure and the peel ply.

The composition of the resin with which the preform is impregnated and that of the resin with which the fibrous fabric is impregnated are as defined in the method described previously.

The intermediate layer is itself composed solely of resin, without a fibrous ply or a stack of fibrous plies. Since the resin is free of curing agent or lightly laden with curing agent, it does not therefore polymerize very much during the polymerization step, at the polymerization temperature of the resin of the preform.

The amount of curing agent in the composition of the resin of the intermediate layer is defined such that, once the part is polymerized, the interface between the structure and the peel ply is polymerized very little, but is polymerized sufficiently so that the peel ply adheres lightly to the outer surface of the structure and does not peel off of its own free will without outside help. Optionally, the peel ply has a dry appearance on the outer surface.

In one example of implementation of the method, the resin contained in the preform and the resin contained in the intermediate layer are identical. They only differ from one another by the presence or absence of curing agent.

The intermediate layer is deposited on the surface of the outer ply of the preform, at the location where the part, once polymerized, is intended to be assembled subsequently, by bonding, with another part.

In implementation examples, the intermediate layer is deposited over all or some of the surface of the outer ply by depositing a film of resin, by spraying or by means of a brush.

Such a method for producing parts is particularly advantageous in that it does not modify the existing associated conventional method very much, while giving the final part an essential property.

In one embodiment of the method, the thermosetting resin contained in the fibrous preform is polymerized to a degree greater than or equal to 75%.

The invention also relates to a method for producing a fiber-reinforced composite material part as described above in at least one of its embodiments, comprising the steps of:
- producing a dry fibrous preform, obtained essentially by a ply or a stack of plies that is (are) not preimpregnated,
- depositing a fibrous fabric preimpregnated with an unpolymerized resin and free of curing agent or lightly laden with curing agent, over all or some of a surface of an outer ply,
- impregnating the dry fibrous preform by transfer of a thermosetting resin forming the matrix,
- polymerizing the fibrous preform and fibrous fabric assembly, and therefore the thermosetting resin contained in the fibrous preform.

At the end of the polymerization step, the preform is held in the resin and forms the structure of the polymerized final part and the fibrous fabric is connected to the structure and forms the peel ply. A polymerization gradient is obtained at the interface between the structure and the peel ply.

The composition of the thermosetting resin with which the preform is impregnated and that of the resin with which the fibrous fabric is impregnated are as defined in the methods described previously.

Such a method for producing parts is particularly advantageous in that it modifies the existing conventional method (RTM or LRI) very little. In the case where a fibrous fabric is not present in the conventional method, a fibrous fabric impregnated with a resin that is free of curing agent or lightly laden with curing agent is added at the surface of the dry preform. In the case where a fibrous fabric is present in the conventional method, it is replaced by a fibrous fabric impregnated with a resin that is free of curing agent or lightly laden with curing agent.

In one embodiment of the method, the thermosetting resin contained in the fibrous preform is polymerized to a degree greater than or equal to 75%.

In other words, irrespective of the method used for producing the fiber-reinforced composite material part, the part will be polymerized conventionally while preserving at its surface, and in particular at the locations where it is intended to be assembled by bonding to another part, an under-polymerized zone, referred to as a bonding zone. For this, the resin of the intermediate layer or of the fibrous fabric, depending on the method chosen, contains little or no curing agent. During the polymerization of the part, there is a slight diffusion of the molecules of the curing agent from the resin preimpregnating the preform to the resin of the fibrous fabric and a gradient is obtained over a small thickness, several tens of µm. The bonding zone is thus confined to the interface between the polymerized structure and the peel ply.

In summary, at the end of the polymerization step, the part obtained has a polymerized structure and a thin layer of resin that is is not polymerized very much, said to be under-polymerized, at the surface of the structure, at the location where the part must be subsequently assembled, and that is protected by the peel ply.

The fact of being able to produce a polymerization gradient over a small surface thickness constitutes an additional and extremely interesting advantage for the parts obtained by the methods of the invention compared to the parts obtained by the existing methods: the parts obtained may be used during a subsequent method of co-curing bonding of said parts. Unlike the parts obtained with the existing methods, where a uniform polymerization is inevitably produced throughout the thickness of the part, i.e. with an identical degree of polymerization irrespective of the location in the thickness of the part, even at the interface between the structure and the peel ply.

The invention also relates to a method for assembling two fiber-reinforced composite material parts, the two parts being as described above in at least one of the embodiments. The method comprises the steps of:
- peeling the peel ply from the part, so as to bare each bonding zone,
- positioning the parts so that the bonding zones are placed opposite, inserting an adhesive film between the two bonding zones,
- pressurized contacting of the two parts in the bonding zone,
- polymerizing the assembly.

The adhesive film inserted contains a curing agent in order to supply molecules of curing agent necessary for the creation of chemical bonds in the under-polymerized resin. The adhesive film may have, on each of these faces, an excess of curing agent.

The invention also relates to a method for assembling two fiber-reinforced composite material parts, one of the two parts being as described above in at least one of its embodiments and the second part is a part in the state of a fibrous preform preimpregnated with an unpolymerized thermosetting resin, said method comprising the steps of:
- peeling the peel ply from each part according to the invention in one of its embodiments, so as to bare the bonding zone,
- positioning the parts, so that the bonding zone is placed opposite the second part, at the location where the assembling should be carried out,
- pressurized contacting of the two parts in the bonding zone,
- polymerizing the assembly.

The molecules of the curing agent are provided by the unpolymerized second part. The unpolymerized second part may have an excess of curing agent on the bonding surface.

In one embodiment of the method, an adhesive film containing a curing agent is inserted between the bonding zone and the second part, during the step of positioning the parts.

In this embodiment, the molecules of the curing agent are provided by the adhesive film. The adhesive may have an excess of curing agent on the face in contact with the part according to the invention.

Irrespective of the method used to assemble two fiber-reinforced composite material parts, during the step of peeling the peel ply, molecules of the under-polymerized resin remain attached to the outer surface of the structure (the resin breaking at the place where it has the least strength, i.e. the place where it is the least polymerized).

Next, during the polymerization step, the curing agent molecules of the adhesive film or of the unpolymerized second part diffuse into the zones that do not contain any, strong chemical bonds will be created, until the polymerization of the assembly is completed.

Such methods may be defined as surface co-curing bonding methods.

Such methods, in combination with the parts of the invention, advantageously make it possible to:
dispense with the surface preparation of the parts,
facilitate and simplify the storage, the handling of the parts, and the equipment necessary for assembling the parts.

In other words, all the ease-of-use advantages of the secondary bonding method are retained while benefiting from the advantages linked to the method of co-curing bonding solely in the bonding zone(s), such as the mechanical strength and the reliability of the bonded joints.

DESCRIPTION OF THE FIGURES

The invention will now be described more specifically within the context of particular embodiments, that in no way limit the invention, represented in FIGS. 1 to 6 that depict.

DESCRIPTION OF A PREFERRED EMBODIMENT

The exemplary embodiment is described in detail in the application thereof to the case of a structural aircraft part. This choice is not limiting and may extend to all parts made of composite material.

Figure 1:
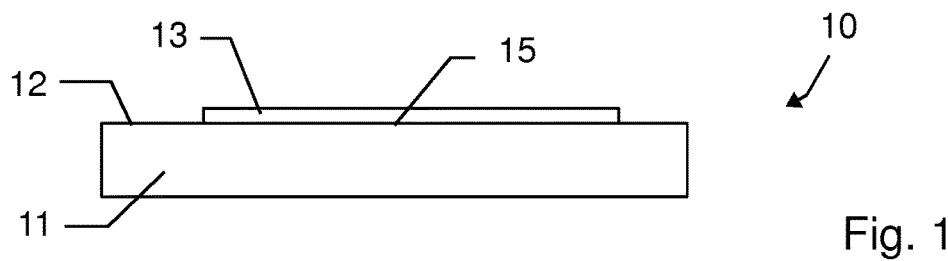
FIG. 1, a part according to the invention.

A composite material part 10 according to the invention, as illustrated in FIG. 1, comprises a structure 11, polymerized, formed of an assembly of fibers held in a thermosetting resin.

The structure 11 may have any shape. It may be flat, as in FIG. 1, or have at least one curve.

The part 10 is intended to be assembled by bonding with another part to form a structural assembly such as a stiffened fuselage panel.

It comprises, over all or some of an outer surface 12 of the structure, a peel ply 13. This peel ply is intended to protect all or some of the outer surface 12 of the structure 11 until the subsequent bonding operation. Said ply is positioned and held on the outer surface 12 of the structure 11, at the location where the part is intended to be subsequently assembled to another part.

The part 10 has, at an interface 15 between the peel ply 13 and the outer surface 12, a zone, of the order of several tens of µm thick, having a polymerization gradient. The polymerization gradient is decreasing from the outer surface 12 of the structure 11 to the peel ply 13.

The interface 15 between the structure and the peel ply is polymerized very little, but is polymerized sufficiently so that the peel ply 13 adheres lightly to the outer surface 12 of the structure 11 and so that it does not peel off in an untimely manner.

In order to produce such a part, three methods are now described, in a non-restrictive manner.

Figure 2:
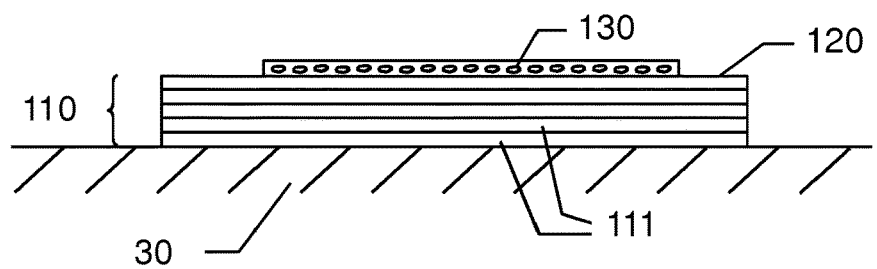
FIG. 2, a step of drape forming during a method for producing the part.
Figure 3:
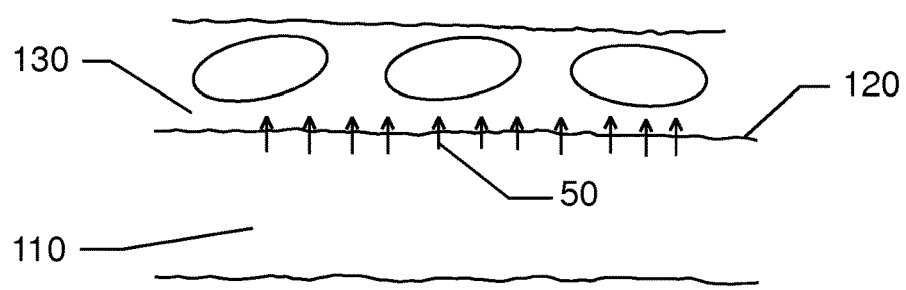
FIG. 3, a step of polymerizing the part during a method for producing this part, FIG. 4, a step of peeling the peel ply during a method for assembling two parts, FIG. 5, a step of positioning two parts relative to one another, during a method for assembling two parts, FIG. 6, the step of polymerizing the two assembled parts during a method for assembling two parts.

First Method Example (FIGS. 2 and 3)

In a first step, a preimpregnated preform 110 is produced.

The preform 110 is defined in a way such that the shape and the volume correspond substantially to the shape and to the dimensions of the final part 10 to be produced.

The preform is for example produced on a mold 30, the shape and the volume of which correspond substantially to the shape and to the dimensions of the part to be produced.

The preform 110 is produced by a single ply 111, or a superposition of at least two plies 111, of fibers preimpregnated with an unpolymerized resin.

The nature and the orientations of the fibers in the ply (plies) is (are) determined according to the type of mechanical stresses to which the part will be subjected, once it is produced.

When the preform is produced by a superposition of plies, the determination of the number of plies and orientations of the fibers in the successive plies is among known calculation techniques which are not described here.

In one exemplary embodiment, the preform 110 comprises a superposition of preimpregnated fibers, for example unidirectional sheets, made of carbon. The preform could also be formed, for example, of glass fibers or Kevlar fibers.

The ply (plies) 111 is (are) preimpregnated with a thermosetting type resin, for example an epoxy resin, with a curing agent.

In one exemplary embodiment, the ply (plies) 111 is (are) preimpregnated with an epoxy resin, of which the base monomer is mainly of DGEBA (bisphenol A diglycidyl ether), TGPAP (triglycidyl para-aminophenol), or TGMDA (tetraglycidyl methylene dianiline) type and the curing agent is of amine type, such as diaminodiphenyl sulfone (DDS).

In a second step, a preimpregnated fibrous fabric 130 is deposited locally on the preform 110.

The fibrous fabric comprises a ply or a superposition of plies.

In one exemplary embodiment, the fibrous fabric 130 comprises a superposition of preimpregnated fibers, for example woven fibers.

In one exemplary embodiment, the fibrous fabric 130 comprises polyester fibers, nylon fibers or glass fibers.

The fibrous fabric 130 is deposited locally on a surface 120 of an outer ply of the preform 110, at a location where the part, once it is produced, is intended to be assembled to another part, by bonding.

The fibrous fabric 130 is preimpregnated with an epoxy-type resin, with no curing agent or very lightly laden with curing agent.

In one exemplary embodiment, the fibrous fabric 130 is impregnated with an epoxy resin, of which the base monomer of the resin is mainly of DGEBA, TGPAP or TGMDA type. The curing agent is for example of amine type, such as DDS.

In a third step, a vacuum cover and environmental products are put in place around the preform-fibrous fabric assembly.

This step is conventional as such and prepares the assembly for the polymerization step.

In a fourth step, the preform-fibrous fabric assembly is polymerized.

The vacuum cover is rendered leaktight by known means. The evacuation of the preform-fibrous fabric assembly is then carried out, having the objective of compacting the preform-fibrous fabric assembly, in particular the plies. The preform-fibrous fabric assembly is then subjected to a heat treatment, at a given temperature, for a given time and at a given pressure.

In the preferred example of the epoxy-type resin, the resin is a polymer thermosetting resin, the crosslinking of which takes place at ambient temperature or at high temperature.

During the polymerization step, the resin contained in the preform spreads out therein, filling the empty zones between the fibers of the various plies. The fibrous fabric is not itself impregnated with the resin of the preform since it is already preimpregnated with its own resin.

During the polymerization cycle, the viscosity of the resins of the fibrous fabric and of the preform decreases with the increase in temperature. The molecules of curing agent and also the polymer chains contained in the resin of the preform will migrate into the layer of resin that is free of curing agent or lightly laden with curing agent, as illustrated by the arrows 50 in FIG. 3. The creation and diffusion of polymer chains between the resin of the preform and the resin of the fibrous fabric is then observed.

This diffusion into the thickness will take place, at most, over several tens of μm, for example between 1 μm and 50 μm.

The parameters that make this diffusion vary are the time, the temperature (parameters which govern the appearance of gelation) and the viscosity. As long as gelation is not achieved, a longer time at the temperature giving the lowest viscosity will favor a longer diffusion.

At the end of the polymerization, a polymerization gradient is obtained over these several tens of μm, at the interface between the structure 11 and the peel ply 13.

The addition of a small amount of curing agent to the resin of the fibrous fabric 130 makes it possible to substantially increase the degree of polymerization in the peel ply 13, once the polymerization is finished. Thus, an improved hold of the peel ply 13 to the outer surface 12 of the structure 11 of the part 10 until the bonding operation is ensured.

In one particular embodiment of the polymerization step, the resin contained in the preform 110 is polymerized to a degree at least equal to 75%.

Figure 4:
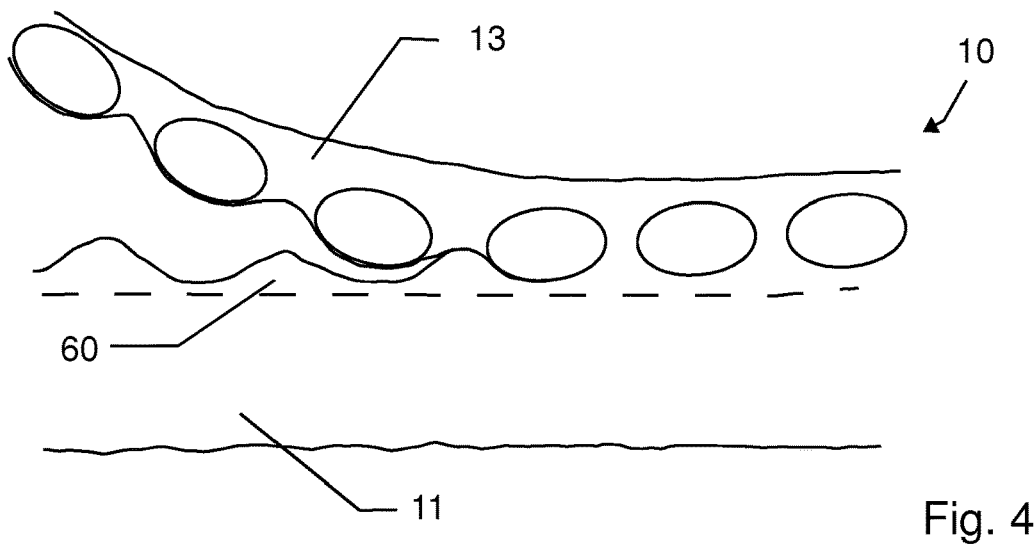
Figure 5:
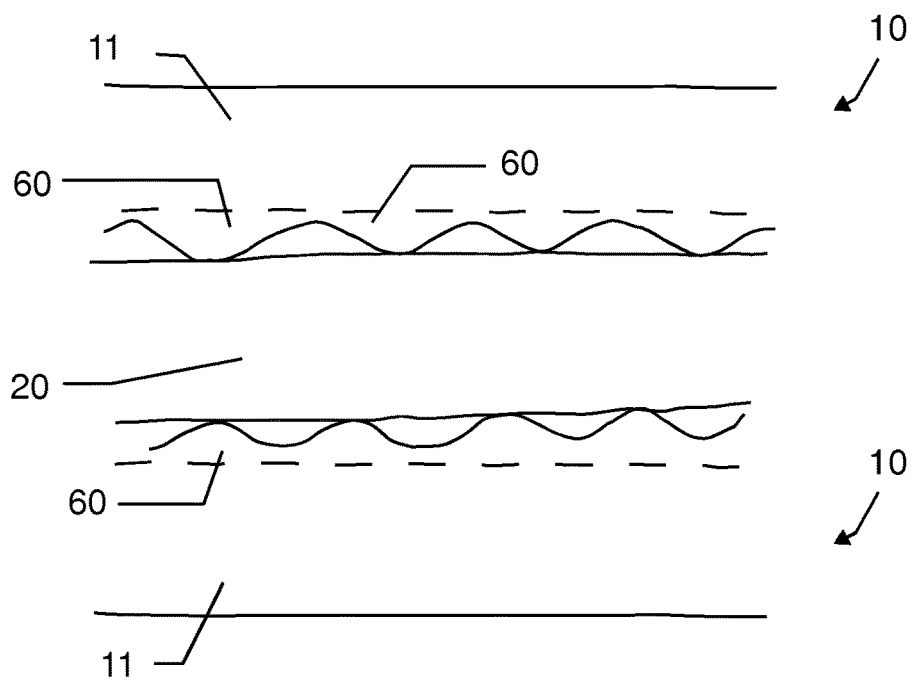
Figure 6:
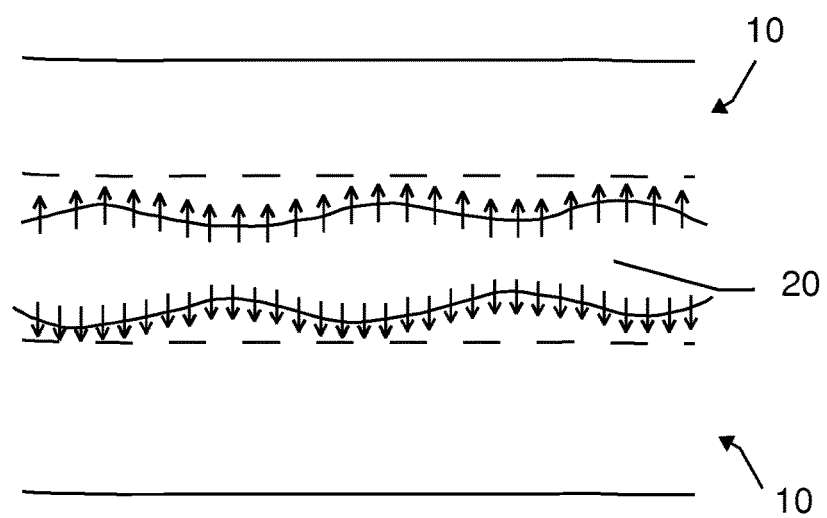

At the end of this fourth step, the part 10 is removed from the mold, without removing the peel ply 13. After optional operations for monitoring the material soundness, or finishing operations for example drillings or machinings, the part obtained is capable of being assembled by bonding to another part, as illustrated in FIGS. 4 to 6.

Second Method Example

The second method repeats the same steps as the first method:
a) production of a preimpregnated fibrous preform 110,
b) local deposition of a fibrous fabric 130 on the preform,
c) installation of the vacuum cover,
d) polymerization,
but differs in that:
the fibrous fabric 130 impregnated with a resin that is free of curing agent or lightly laden with curing agent is replaced by a dry fibrous fabric,
it comprises an additional step, between steps a) and b), of depositing an intermediate layer of resin that is free of curing agent or lightly laden with curing agent.

The intermediate layer is deposited, for example by spraying, on a surface of an outer ply of the preform 110.

At the end of the polymerization, a polymerization gradient is obtained over these few tens of μm, at the interface between the structure 11 and the peel ply 13.

Third Method Example

In a first step, a dry fibrous preform 110 is produced.

As for the first method example, the fibrous preform 110 is produced by a ply or a superposition of at least two plies. This time, the plies are not impregnated with resin.

The fibrous preform 110 comprises dry fibers, of which the nature and the orientations are also determined according to a predetermined criterion (mechanical loading, etc.).

The fibrous preform 110 is for example placed inside a mold, the shape and the volume of which correspond substantially to the shape and to the dimensions of the part to be produced.

In a second step of the method, a fibrous fabric 130 preimpregnated with a resin that is free of curing agent or lightly laden with curing agent is deposited locally on the preform.

In a third step of the method, the preform-fibrous fabric assembly is confined in a hermetically sealed chamber in order to subsequently create therein the conditions necessary for a polymerization.

The hermetically sealed chamber is delimited for example by a mold/counter-mold assembly or a vacuum cover surrounding the preform-fibrous fabric assembly.

In a fourth step of the method, a thermosetting resin with curing agent is injected into the hermetically sealed chamber delimited by the mold or the vacuum cover.

The resin is injected through openings made in the mold/counter-mold or the vacuum cover. The resin is injected so as to spread out uniformly in the sealed chamber. More specifically, the resin spreads out in the preform filling the empty zones between the dry fibers of the various plies of the preform.

The injection flow rate is regulated so as not to drive out the resin contained in the fibrous fabric.

In a fifth step, the preform-fibrous fabric assembly is polymerized. This step is identical to that described in the first method example.

At the end of the polymerization, a polymerization gradient is obtained over these few tens of μm, at the interface between the structure 11 and the peel ply 13.

The parts 10 obtained by any one of the methods described above are polymerized, except at the interface between the structure 11 and the peel ply 13 where an under-polymerized zone is present. Such parts, owing to this under-polymerized zone, may advantageously be assembled with one another by a co-curing bonding method.

FIGS. 4 to 6 illustrate the various steps necessary for the assembling of two parts according to the invention.

In a first step (FIG. 4), the peel ply 13 of each part 10 is removed by peeling.

Each peel ply 13 is removed so as to bare the under-polymerized zone, or bonding zone. Rupture occurs in zones that are not very strong, that is to say at the place where the degree of polymerization is lowest.

During this removal, resin from the peel ply 13 remains attached to the surface of the structure illustrated by the reference 60 in FIGS. 4 and 5.

In a second step, the two parts 10 are positioned with respect to one another.

The two parts 10 are positioned so that the bonding zones are placed opposite.

An adhesive film 20 is inserted between the two bonding zones. Said adhesive film consists of a thermosetting resin with curing agent. The adhesive may have, on each of these faces, an excess of curing agent. Such an adhesive film is necessary in order to provide curing agent molecules necessary for the subsequent polymerization of the under-polymerized resin attached to the structure 11. Such an adhesive film 20 also makes it possible to fill in a possible gap between the two bonding zones in contact.

In one exemplary embodiment, the adhesive film 20 is based on an epoxy-type resin.

The two parts are then brought into contact under pressure in the bonding zone.

In a third step, the parts-adhesive film assembly is confined in a hermetically sealed chamber in order to subsequently create therein the conditions necessary for a polymerization.

In a fourth step, the parts-adhesive film assembly is polymerized.

During this step, the resin of the adhesive film 20 and the under-polymerized resin of each part 10 liquefy (reduction of the viscosity due to the increase in the temperature in the sealed chamber). The curing agent molecules contained in the adhesive film 20 and also the polymer chains of the adhesive film and of the under-polymerized resin layer 60 will migrate and interdiffuse.

These new chains bond to the polymer chains already present in the under-polymerized resin layer and enable the densification of the three-dimensional network formed by the polymer chains, until the complete polymerization of the interface of the resin of the part and resin of the adhesive film.

This operation takes place simultaneously on either side of the adhesive film 20.

Thus, a completely polymerized joint is obtained between the two parts 10, with the creation of a continuous three-dimensional network of polymer chains between said two parts.

At the end of this polymerization, the assembly may be considered to be a single part, like for any assembly produced by a conventional co-curing bonding method.

It goes without saying that the parts 10 of the invention may also be assembled with an unpolymerized part, by the same method.

In this case, during the positioning step, the bonding zone of the part 10 is placed opposite the unpolymerized part, at the location where assembling should be carried out. The introduction of the adhesive film is optional, the curing agent molecules being contained in the unpolymerized part.

The same advantages as those of a conventional co-curing bonding method are obtained, namely:
  no operation for surface preparation of the parts before the assembling thereof,
  joint insensitive to mild surface pollution before the bonding,
  good mechanical strength owing to the use of the adhesive film between the two parts.

Furthermore, the same advantages as those of a conventional secondary bonding method are obtained, namely:
  simplification of the polymerization equipment and bonding equipment,
  possibility of locally heating the bonding zones without heating the whole of the parts,
  simplification of the nondestructive testing (easy testing of each of the individual parts before assembly),
  easy storage and handling.

The proposed invention advantageously makes it possible to produce a pre-polymerized part suitable for a co-curing bonding method.

The invention claimed is:

1. A method for producing a fiber-reinforced composite material part, comprising the steps of:
  producing a dry fibrous preform comprising dry fibers in a mold with a shape and volume corresponding to a shape and dimensions of the fiber-reinforced composite material part;
  depositing a fibrous fabric, pre-impregnated with an unpolymerized thermosetting resin, the unpolymerized thermosetting resin being substantially free of a curing agent, over all or some of a surface of an outer ply of the dry fibrous preform;
  confining an assembly of the dry fibrous preform and the fibrous fabric in a hermetically sealed chamber;
  injecting an unpolymerized thermosetting resin with the curing agent into the hermetically sealed chamber to fill empty zones between the dry fibers of the dry fibrous preform with the unpolymerized thermosetting resin with the curing agent; and
  polymerizing the assembly of the dry fibrous preform and the fibrous fabric such that the unpolymerized thermosetting resin contained in the dry fibrous preform is polymerized to a degree greater than or equal to 75% to form a structure formed of the assembly of fibers held in a polymerized thermosetting resin and a peel ply over all or some of an outer surface of the structure, wherein the fiber-reinforced composite material part has a polymerization gradient at an interface between the structure and the peel ply due to migration of molecules of the curing agent in the unpolymerized thermosetting resin of the dry fibrous preform into the unpolymerized thermosetting resin of the fibrous fabric at the interface during the polymerization.

2. A method for assembling two fiber-reinforced composite material parts, each fiber-reinforced composite material part produced according to the method of claim 1, the method comprising steps of:
  peeling the peel ply from said each fiber-reinforced composite material part to expose an under-polymerized bonding zone for said each fiber-reinforced composite material part;
  positioning the two fiber-reinforced composite material parts such that the respective under-polymerized bonding zones faced each other;
  inserting an adhesive film between the two under-polymerized bonding zones;
  pressurized contacting of the two fiber-reinforced composite material parts in its respective under-polymerized bonding zone; and
  polymerizing the assembly.

3. A method for assembling two fiber-reinforced composite material parts, a first fiber-reinforced composite material part produced according to claim 1 and a second fiber-reinforced composite material part is in a state of a fibrous preform pre-impregnated with an unpolymerized thermosetting resin, the method comprising the steps of:
  peeling the peel ply from the first fiber-reinforced composite part to expose an under-polymerized bonding zone;
  positioning the two fiber-reinforced composite material parts, such that the under-polymerized bonding zone is placed opposite the second fiber-reinforced composite part, at a point of assembly;

pressurized contacting of the two fiber-reinforced composite material parts in the bonding zone; and
polymerizing the assembly.

4. The method as claimed in claim 3, wherein the step of positioning comprises a step of inserting an adhesive film between the under-polymerized bonding zone and the second fiber-reinforced composite part.

5. A method for producing a fiber-reinforced composite material part, comprising the steps of:
 producing a dry fibrous preform comprising dry fibers in a mold with a shape and volume corresponding to a shape and dimensions of the fiber-reinforced composite material part;
 depositing a fibrous fabric, pre-impregnated with an unpolymerized thermosetting resin lightly laden with a curing agent such that an amount of the curing agent in the fibrous fabric is less than 30% by weight of a nominal amount of the curing agent recommended by a manufacturer or supplier of the curing agent, over all or some of a surface of an outer ply of the dry fibrous preform;
 confining an assembly of the dry fibrous preform and the fibrous fabric in a hermetically sealed chamber;
 injecting an unpolymerized thermosetting resin with the curing agent into the hermetically sealed chamber to fill empty zones between the dry fibers of the dry fibrous preform with the unpolymerized thermosetting resin with the curing agent; and
polymerizing the assembly of the dry fibrous preform and the fibrous fabric such that the unpolymerized thermosetting resin contained in the dry fibrous preform is polymerized to a degree greater than or equal to 75% to form a structure formed of the assembly of fibers held in a polymerized thermosetting resin and a peel ply over all or some of an outer surface of the structure, wherein the fiber-reinforced composite material part has a polymerization gradient at an interface between the structure and the peel ply due to migration of molecules of the curing agent in the unpolymerized thermosetting resin of the dry fibrous preform into the unpolymerized thermosetting resin of the fibrous fabric at the interface during the polymerization.

* * * * *